United States Patent
Lee et al.

(10) Patent No.: US 8,637,122 B2
(45) Date of Patent: Jan. 28, 2014

(54) METHOD OF MANUFACTURING TRANSPARENT CONDUCTIVE FILM CONTAINING CARBON NANOTUBES AND BINDER, AND TRANSPARENT CONDUCTIVE FILM MANUFACTURED THEREBY

(75) Inventors: Geon-Woong Lee, Changwon-si (KR); Joong Tak Han, Changwon-si (KR); Jong Seok Woo, Gumi-si (KR); Sun Young Kim, Changwon-si (KR)

(73) Assignee: Korea Electrotechnology Research Institute (KR)

(*) Notice: Subject to any disclaimer, the term of this patent is extended or adjusted under 35 U.S.C. 154(b) by 1141 days.

(21) Appl. No.: 11/950,336

(22) Filed: Dec. 4, 2007

(65) Prior Publication Data

US 2008/0286559 A1    Nov. 20, 2008

(30) Foreign Application Priority Data

May 18, 2007  (KR) .................... 10-2007-0048708

(51) Int. Cl.
- *B05D 5/12* (2006.01)
- *B05D 1/12* (2006.01)
- *B05D 3/02* (2006.01)
- *B05D 3/00* (2006.01)
- *B29C 71/02* (2006.01)

(52) U.S. Cl.
USPC ........ 427/541; 427/565; 427/372.2; 427/108; 427/180

(58) Field of Classification Search
USPC .............. 252/500, 502; 427/58, 62, 108, 110, 427/180, 197, 240, 372.2, 565, 541; 977/742, 750, 752, 753
See application file for complete search history.

(56) References Cited

U.S. PATENT DOCUMENTS

| | | | | |
|---|---|---|---|---|
| 5,618,875 | A | * | 4/1997 | Baker et al. .................... 524/495 |
| 5,853,877 | A | * | 12/1998 | Shibuta ......................... 428/357 |
| 7,060,241 | B2 | * | 6/2006 | Glatkowski ................ 423/447.1 |
| 7,135,158 | B2 | * | 11/2006 | Goto et al. ................. 423/447.1 |
| 2006/0039848 | A1 | * | 2/2006 | Matarredona et al. ..... 423/447.1 |

FOREIGN PATENT DOCUMENTS

| EP | 1542240 A2 | 6/2005 |
|---|---|---|
| JP | 2006045383 A | 2/2006 |
| KR | 1020040030553 A | 4/2004 |
| KR | 1020050011867 A | 1/2005 |
| KR | 1020060092737 A | 8/2006 |

* cited by examiner

*Primary Examiner* — Michael Wieczorek
(74) *Attorney, Agent, or Firm* — Park & Associates IP Law, P.C.

(57) ABSTRACT

This invention relates to a method of manufacturing a transparent conductive film containing carbon nanotubes and a binder, in which the carbon nanotubes are subjected to acid treatment, dispersion in a solvent, mixing with the binder, and application on the substrate, and to a transparent conductive film manufactured thereby. The method includes subjecting carbon nanotubes having an outer diameter of less than 15 nm to acid treatment to thus purify and surface functionalize them, followed by dispersing the treated carbon nanotubes in a solvent along with the binder, or mixing a carbon nanotube solution using a polar or nonpolar solvent with a binder solution, and applying the mixture on the substrate. Through the application of the mixture of treated carbon nanotubes and binder on the substrate, the transparent conductive film has improved transparency, electrical conductivity, dispersibility, substrate adhesiveness, chemical stability, durability and scratch resistance, and can be applied to various substrates, including hard or flexible substrates, thanks to high substrate adhesiveness and applicability. A solution in which the surface functionalized carbon nanotubes are well dispersed is prepared, thus facilitating the manufacture of the film using various materials and generating economic benefits.

15 Claims, 4 Drawing Sheets

(a)

(b)

(a) (b) (c)

(a) (b) (c)

(a)

(b)

(a)            (b)

METHOD OF MANUFACTURING TRANSPARENT CONDUCTIVE FILM CONTAINING CARBON NANOTUBES AND BINDER, AND TRANSPARENT CONDUCTIVE FILM MANUFACTURED THEREBY

REFERENCE TO RELATED APPLICATIONS

This application claims priority of Korean Patent Application No. 10-2007-0048708 filed May 18, 2007, the entire contents of which are incorporated herein by reference.

FIELD OF THE INVENTION

The present invention relates to a method of manufacturing a transparent conductive film and more particularly, to a method of manufacturing a transparent conductive film containing carbon nanotubes and a binder, in which carbon nanotubes, subjected to acid treatment, are mixed with the binder to thus improve dispersibility and adhesiveness to a substrate, and to a transparent conductive film manufactured thereby.

BACKGROUND OF THE INVENTION

Generally, a transparent conductive film is used for plasma display panels (PDPs), liquid crystal displays (LCDs), light emitting diodes (LEDs), organic electroluminescent devices (OELDs), touch panels, solar cells, etc.

Because the transparent conductive film has high conductivity (e.g., sheet resistance not higher than $1 \times 10^3$ Ω/sq) and high transmittance in the visible light range, it may be used as the electrode of not only solar cells, LCDs and PDPs but also of various light-receiving devices and light-emitting devices, and as well, as a transparent electromagnetic wave blocking unit, including an antistatic film or an electromagnetic wave blocking film, for use in automobile window glass or building window glass, and a transparent heating unit, including an infrared reflection film or a freezing showcase.

The transparent conductive film includes antimony or fluorine-doped tin oxide ($SnO_2$) films, aluminum or potassium-doped zinc oxide (ZnO) films, tin-doped indium oxide ($In_2O_3$) films, etc.

In particular, the tin-doped indium oxide film, that is, an $In_2O_3$—Sn based film, is called an ITO (Indium Tin Oxide) film, and is frequently used because it facilitates the formation of a low resistance film. Although ITO, having superior general properties, is mainly applied to the process to date, indium oxide ($In_2O_3$) is produced as a by-product in a zinc (Zn) mine, and problems of instable supply and unmet demand arise. Further, the ITO film is not flexible and thus cannot be used as a flexible material for a polymer substrate, and furthermore, because it is manufactured under conditions of high temperature and high pressure, the production cost thereof is undesirably high.

In order to obtain a flexible display, a conductive polymer may be applied on the upper surface of a polymer substrate, but the film thus obtained has low electrical conductivity or is opaque, and therefore, the use thereof is limited.

With the aim of solving the above problems, techniques for applying carbon nanotubes on various types of substrates are widely studied these days. The carbon nanotubes have electrical resistance of $10^{-4}$ Ωcm to thus exhibit electrical conductivity similar to that of metal, and have a surface area at least 1000 times larger than bulk materials and a length thousands of times longer than the outer diameter thereof, and thus are considered to be an ideal material for realizing desired conductivity. Moreover, the carbon nanotubes may be improved in adhesive force to a substrate through surface functionalization thereof. In particular, because the carbon nanotubes may be applied to the flexible substrate, the uses thereof are expected to be numerous.

A conventional technique using carbon nanotubes, entitled "coating containing carbon nanotubes" (Korean Unexamined Patent Publication No. 10-2004-0030553), is disclosed. In the conventional technique, because only carbon nanotubes having an outer diameter of 3.5 nm should be used, in consideration of the dispersibility and electrical conductivity thereof, there is a limitation in the use of the material. Also, when the coating is prepared, the properties, including dispersibility and adhesiveness, of the carbon nanotubes are gradually decreased over time.

SUMMARY OF THE INVENTION

Accordingly, the present invention has been made keeping in mind the above problems occurring in the related art, and the present invention provides a method of manufacturing a transparent conductive film containing carbon nanotubes and a binder, in which carbon nanotubes, subjected to acid treatment, are mixed with the binder, thus increasing dispersibility and adhesiveness to a substrate, and also provides a transparent conductive film manufactured thereby.

In addition, the present invention provides a method of manufacturing a transparent conductive film containing carbon nanotubes and a binder, which enables the preparation of a solution in which relatively inexpensive carbon nanotubes, having an outer diameter of less than 15 nm, are efficiently dispersed through purification and surface functionalization thereof, thus exhibiting high transparency and electrical conductivity, and also provides a transparent conductive film manufactured thereby.

BRIEF DESCRIPTION OF THE DRAWINGS

FIG. 2A to 2C are photographs illustrating the degree of dispersion of the carbon nanotube solutions in the examples and comparative examples, in which FIG. 2A illustrates the carbon nanotube solution, FIG. 2B illustrates the carbon nanotube/binder coating solution, and FIG. 2C illustrates the carbon nanotube solution using carbon nanotubes which are not subjected to acid treatment;

FIGS. 5A and 5B are photographs illustrating the results of a test of the adhesion of the transparent conductive film according to the present invention to the substrate, in which FIG. 5A illustrates the case containing no binder, and FIG. 5B illustrates the case containing the binder.

DETAILED DESCRIPTION OF THE INVENTION

Figure 1:
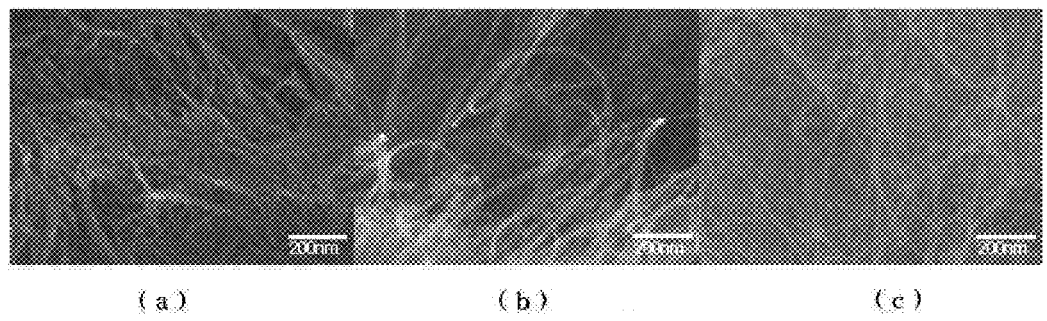
FIG. 1A is a scanning electron micrograph (SEM) illustrating the surface of single-walled carbon nanotubes.
FIG. 1B is an SEM illustrating the surface of double-walled carbon nanotubes.
FIG. 1C is an SEM illustrating the surface of multi-walled carbon nanotubes, used in the present invention.

According to the present invention, a method of manufacturing a transparent conductive film containing carbon nanotubes and a binder may include subjecting carbon nanotubes to dispersion in a solvent, to mixing with the binder, and then to application on the upper surface of a substrate.

The carbon nanotubes may include any one selected from among single-walled carbon nanotubes, double-walled carbon nanotubes, and multi-walled carbon nanotubes. FIGS. 1A to 1C are SEMs illustrating the surfaces of the single-walled carbon nanotubes, the double-walled carbon nanotubes, and the multi-walled carbon nanotubes, used in the present invention.

As the carbon nanotubes, relatively inexpensive carbon nanotubes having an outer diameter of less than 15 nm may be used. Although only carbon nanotubes having an outer diameter of less than 3 nm should be used in the conventional technique, in the present invention it is possible to use carbon nanotubes having a greater outer diameter thanks to improvements in dispersibility. In the case of the multi-walled carbon nanotubes, the refractive index may change due to the great number of walls and transmittance may be deteriorated due to Rayleigh scattering. Thus, in consideration of dispersibility of the particles, the particle size should be smaller than the wavelength ($\lambda$)/20. Further, in consideration of the transparency of the film and the dispersibility of the carbon nanotubes, carbon nanotubes having an outer diameter of less than 15 nm, at a maximum, should be used in the visible light range ($d<\lambda/20 \rightarrow <d<\sim 15$ nm). This is because the dispersibility of the carbon nanotubes is improved by the solvent and binder according to the present invention.

In the case of the single-walled carbon nanotubes, upon the synthesis thereof, semiconductive carbon nanotubes and metallic carbon nanotubes may be mixed. Although a process of separating these different carbon nanotubes should be performed, if necessary, in the present invention, it does not matter where carbon nanotubes, in a state where two types of carbon nanotubes are mixed, are used. Hence, in the present invention, inexpensive carbon nanotubes may be used, without the need to separate and purify carbon nanotubes.

For primary dispersion, the carbon nanotubes are dissolved in a solvent. Here, the solvent includes a polar solvent or a nonpolar solvent, and preferably, the solvent includes one or more selected from among acetone, methylethylketone, methylalcohol, ethylalcohol, isopropylalcohol, butylalcohol, ethyleneglycol, polyethyleneglycol, tetrahydrofuran, dimethylformamide, dimethylacetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, and dimethylsulfoxide, to prepare the carbon nanotube solution.

Further, for uniform dispersion in the solvent, ultrasonic dispersion or ball milling may be conducted. Depending on the capacity of the carbon nanotubes and the amount of the solvent, ultrasonic waves are applied for 1~60 hours using a sonicator having power of 50~700 W at a frequency ranging from 20 kHz to 50 kHz, thus uniformly dispersing the carbon nanotubes in the solvent ($2^{nd}$ step).

When the carbon nanotubes are dispersed in the solvent, a dispersion stabilizer may be additionally used, thus further increasing solvent dispersibility and maintaining a final transparent conductive film in a stable state without any change in the properties thereof, resulting in a transparent conductive film having uniform properties.

Here, before the carbon nanotube solution is prepared, an acid solution is added to purify the carbon nanotubes to thus realize surface functionalization, thereby further increasing the dispersibility of the carbon nanotubes in the solvent and binder. As the acid solution, one selected from among nitric acid, hydrochloric acid, sulfuric acid, hydrogen peroxide and mixtures thereof is used, such that a carboxyl group is introduced to the end portion and surface of the carbon nanotubes. The purified carbon nanotubes are washed with distilled water, thus removing remaining acid solution. Finally, through filtration and drying, the purified carbon nanotubes having the substituted carboxyl group are obtained ($1^{st}$ step). The carbon nanotubes thus purified are dispersed in the solvent, thus preparing the carbon nanotube solution, which is then mixed with the binder, described below.

When preparing the carbon nanotube solution dispersed in the solvent, the binder is added, or alternatively, a binder solution is separately prepared, by mixing the binder with the polar or nonpolar solvent, and is then mixed with the carbon nanotube solution, thus preparing a carbon nanotube/binder coating solution in which the carbon nanotubes and the binder are mixed. As such, the amount of the binder is appropriately set depending on the end use, transparency and electrical conductivity of the transparent conductive film. Preferably, the binder is added in an amount of 15~85 parts by weight, based on 100 parts by weight of the mixture of the carbon nanotubes and the binder. When the amount of the binder is less than the lower limit, dispersibility and adhesiveness to a substrate are decreased. On the other hand, when the amount of the binder exceeds the upper limit, electrical conductivity and transparency are decreased.

Here, the binder may be a polymer resin, and preferably includes material selected from among thermoplastic resins, thermosetting resins, light curable resins, silane compounds, polymeric copolymers, self-assembled resins, and combinations thereof. The binder functions to increase the dispersibility of the carbon nanotubes and adhesiveness to the substrate and improve chemical stability, durability and scratch resistance ($3^{rd}$ step).

Then, the carbon nanotube/binder coating solution is applied on the upper surface of a substrate. As the substrate, various substrates, which are conductive or non-conductive, may be used because the carbon nanotubes have high reactivity and electrical conductivity. Preferably, the substrate includes one selected from among glass, crystal, glass wafers, silicon wafers, and plastics.

The coating of the substrate with the carbon nanotube/binder coating solution is preferably conducted through any one selected from among spraying, dip coating, spin coating, screen coating, ink-jet printing, pad printing, knife coating, kiss coating, and gravure coating. Before the coating is conducted, with the additional use of a solvent suitable for respective coating methods or through vacuum distillation, the carbon nanotube/binder coating solution is controlled in the viscosity thereof, after which the substrate may be coated therewith.

Using the above-mentioned coating method, the carbon nanotube/binder coating solution is applied to a thickness ranging from tens to hundreds of nm on the substrate, depending on the end use of the transparent conductive film ($4^{th}$ step). Subsequently, drying is performed to remove the solvent and solidify the binder, thereby completing the transparent conductive film according to the present invention ($5^{th}$ step).

A better understanding of the present invention may be obtained through the following examples, which are set forth to illustrate, but are not to be construed as the limit of the present invention.

EXAMPLE 1

The present example is directed to the preparation of a carbon nanotube (CNT)/binder coating solution in a dispersion state, in which thin-multi-walled carbon nanotubes (thin-MWNTs) and a binder are mixed, and to the manufacture of a transparent conductive film.

The CNT/binder coating carbon was prepared through the following procedure.

0.1 g of thin-MWNTs, which are present in an agglomerated state, and 100 ml of 30 vol % nitric acid ($HNO_3$) solution were placed in a 500 ml Erlenmeyer flask, after which the MWNTs were dispersed for 1 hour using a sonicator. As illustrated in FIG. 1, the thin-MWNT used was thin-MWNTs (ILJIN Nanotech, purity: 95 wt %) having an outer diameter of 4~10 nm and a length of 10~20 μm.

The solution thus prepared was refluxed at the boiling point for 1 hour, filtered four or more times using filter paper (pore size: 25 μm) to remove the residual acid solution from the carbon nanotubes, and then dried, thus preparing MWNTs having a substituted carboxyl group (—COOH) without impurities (metal catalyst, etc.).

Figure 2:
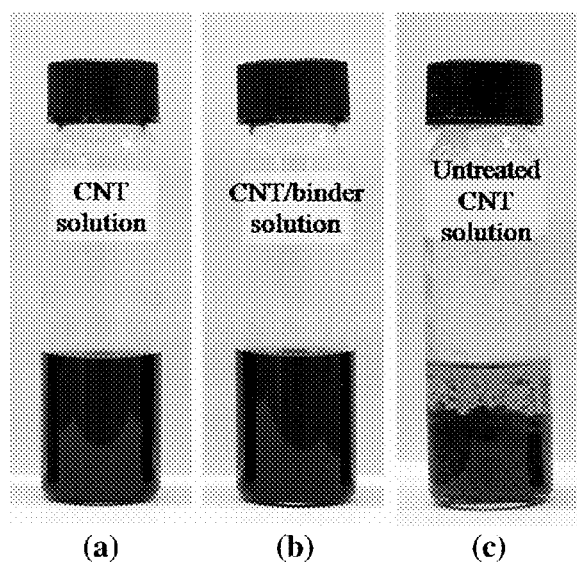

Thereafter, a solution in which the MWNTs were dispersed in the solvent was prepared as follows. 50 mg of the MWNTs were mixed with 200 ml of a solvent including dimethylformamide (DMF), tetrahydrofuran (THF), ethanol, acetone, and dimethylacetamide (DMAc) in an Erlenmeyer flask, and then dispersed using a sonicator having 150 W at 40 kHz for 6 hours, thus preparing a CNT solution. FIG. 2A illustrates the CNT solution in which the CNTs were dispersed in the solvent.

Then, this solution was mixed with a binder. As the binder, thermosetting epoxy (Kukdo Chemical) and light curable acrylate epoxy (SK Cytec) were respectively added in amounts of 15~95 parts by weight, based on 100 parts by weight of the mixture of the CNTs and the binder. Then, the mixture of the CNTs and the binder was treated using a sonicator for 2 hours, thus preparing a CNT/epoxy binder coating solution. FIG. 2B illustrates the CNT/epoxy binder coating solution.

The CNT/epoxy binder coating solution thus prepared was subjected to spray coating at a spray rate of 1 ml/min and a nozzle speed of 200 mm/sec to thus be applied on the upper surface of a glass substrate and a polymer substrate (PES or PET film). In the case of thermosetting epoxy, drying was conducted at 200° C. for 30 min using a hot air dryer to remove the solvent and cure the binder. In the case of light curable epoxy, in order to remove the solvent, drying was performed using an oven at 80° C. for 5 min, followed by radiating light at a wavelength of 320 nm and intensity of 30 mW/cm$^2$ for 1~2 min using a UV radiator (LUMATEC, SUV-DC). Thereby, a transparent conductive film was manufactured.

Figure 6:
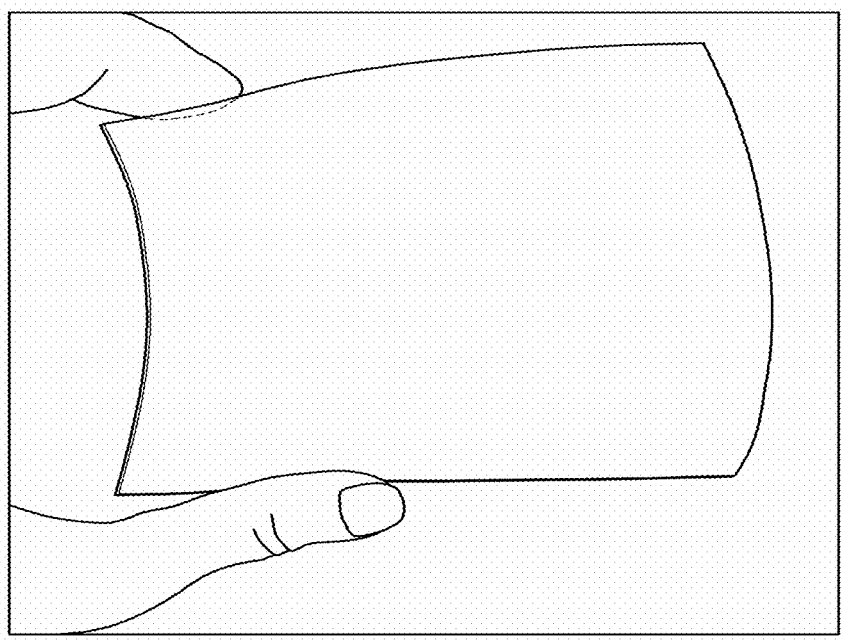
FIG. 6 is a view illustrating the flexible transparent conductive film according to the present invention.

As seen in FIG. 6, the transparent conductive film includes the CNTs and the binder, in which the CNTs are uniformly formed to a high density. Depending on the binder content, the sheet resistance of the transparent conductive film was measured at least five times using a 4-probe conductivity meter (Mitsubishi Chemical Corp., MCP-T610), and then averaged. Light transmittance was measured using a UV-vis-NIR spectrophotometer (VARIAN, Cary 5000).

EXAMPLE 2

The present example is directed to the preparation of a CNT/binder coating solution in a dispersion state, in which double-walled carbon nanotubes (DWNT) and a binder are mixed, and to the manufacture of a transparent conductive film.

In the case of the DWNTs, acid treatment as in Example 1 was applied, thus preparing chemically treated DWNTs. As seen in FIG. 1B, the DWNT used was DWNTs (CNI, USA, impurity: 5%) having an average outer diameter of 3 nm and a length of 10~20 μm. A DWNT/binder coating solution was prepared in the same method as in Example 1, and a transparent conductive film was manufactured using the same method.

EXAMPLE 3

The present example is directed to the preparation of a CNT/binder coating solution in a dispersion state, in which single-walled carbon nanotubes (SWNTs) and a binder are mixed, and to the manufacture of a transparent conductive film.

In the case of the SWNTs, acid treatment as in Example 1 was applied, thus preparing chemically modified SWNTs. The SWNT used was SWNTs (HiPco tube CNI, impurity: 5%) having an average outer diameter of 1 nm and a length of 20 μm. A SWNT/binder coating solution was prepared in the same method as in Example 1, and a transparent conductive film was manufactured using the same method.

The transparent conductive films thus manufactured had a difference in sheet resistance on the order of ±20% depending on the type of solvent used, which is based on the difference in the dispersibility of the CNTs in the solvent. As is apparent from Table 1, the transparent conductive film can be seen to exhibit sheet resistance on the order of 100~300 Ω/sq at 80% transmittance in the case of using SWNTs and DWNTs, and higher sheet resistance on the order of 250~500 Ω/sq at the same transmittance in the case of using thin-MWNTs having a relatively larger outer diameter than SWNTs and DWNTs, due to the high aspect ratio and high electrical conductivity of the CNTs.

Figure 3:
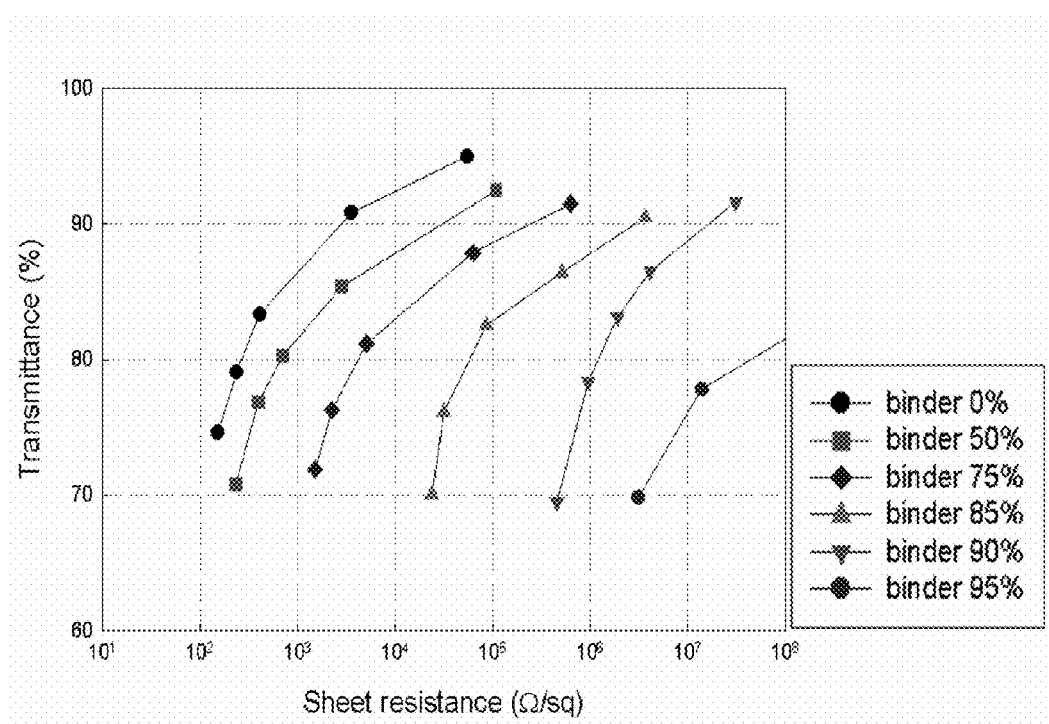
FIG. 3 is a view illustrating the optoelectronic properties of the transparent conductive film depending on the binder content, according to the present invention.
Figure 4:
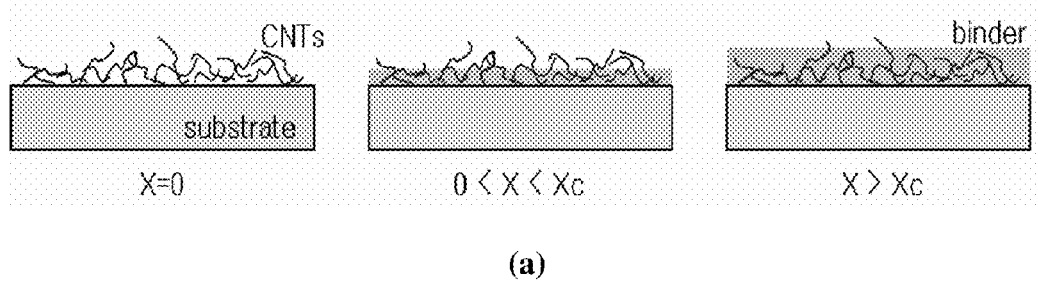
FIGS. 4A and 4B are views illustrating the critical binder content relative to the amount of carbon nanotubes in terms of optoelectronic properties, according to the present invention.
Figure 4:
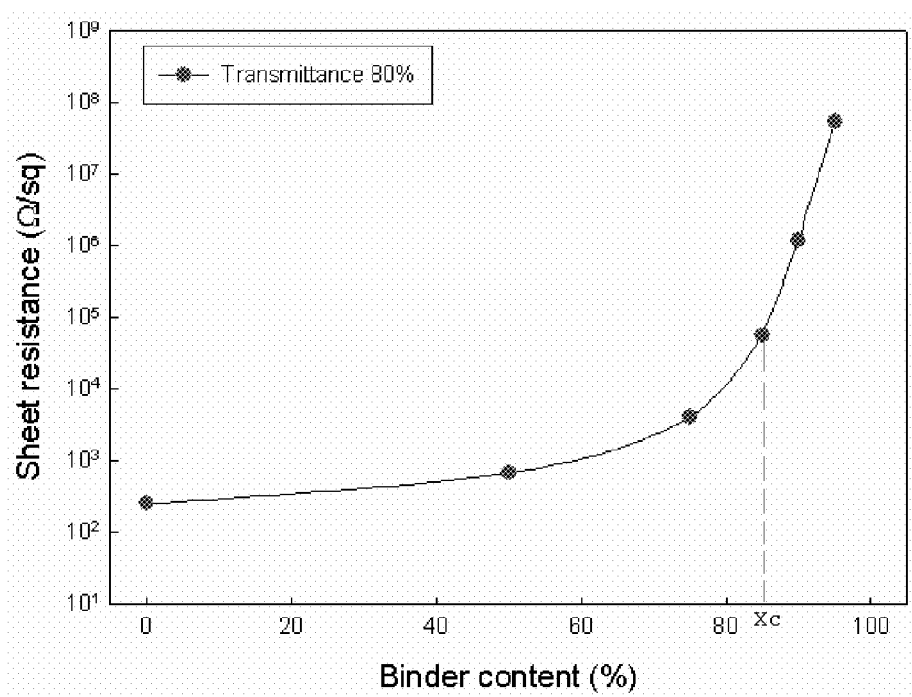

The above sheet resistance results correspond to the use of the binder in an amount less than 50%. As seen in FIG. 3, as the binder content is increased, the sheet resistance is regularly changed. When the results of FIG. 3 are represented by the relationship of the binder content versus sheet resistance, a critical binder content (Xc) can be seen to be present, as shown in FIG. 4B. As seen in FIG. 4A, as the binder content is increased in the CNT layer on the substrate (X=binder content, X=0; the case where the binder content is zero, 0<X<Xc; the case where the binder content is appropriate, Xc<X; the case where the binder content is excessive), a phenomenon in which the conductive CNT layer is embedded occurs, so that ultimately, no surface conductivity is exhibited.

Figure 5:
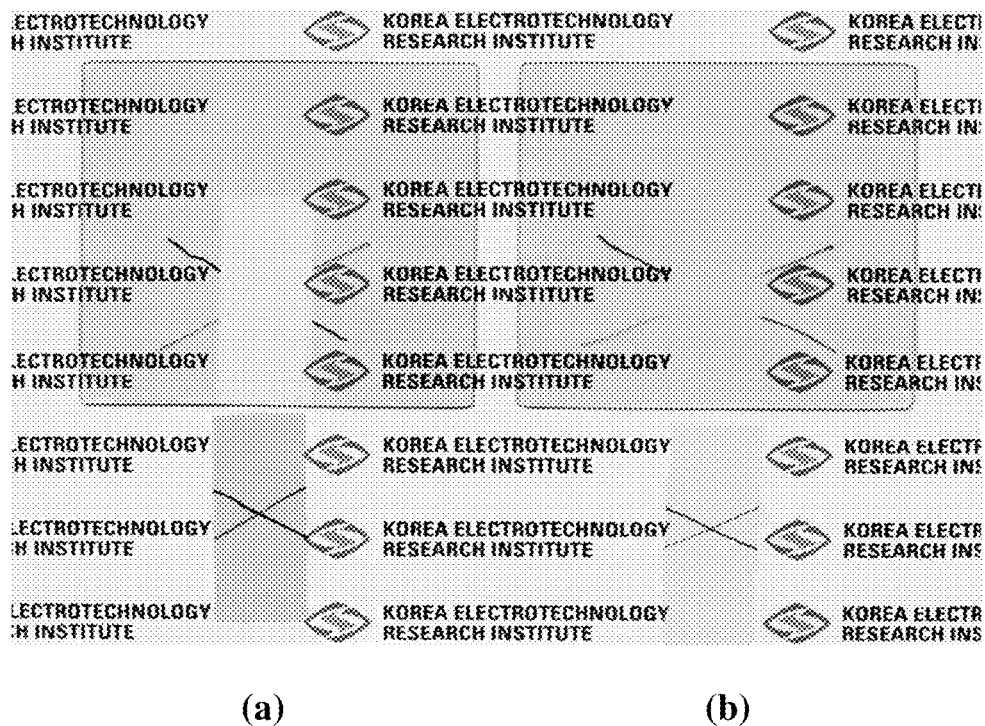

The critical binder content, which is discovered in the present invention, is approximately 85 parts by weight relative to 15 parts by weight of the CNTs. This means that the binder should be used in an amount not greater than 85 parts by weight at a maximum. Specifically, in order to minimize sheet resistance loss, the binder content is appropriately set to 15~50 parts by weight, based on 100 parts by weight of the mixture of the CNTs and the binder. On the other hand, in the case where the binder is not used, the CNTs are observed to be easily detached due to the poor adhesive force between the CNTs and the substrate. FIG. 5 shows two types of transparent conductive film applied on the glass substrate. FIG. 5A shows the sample containing no binder, in which almost all of the CNTs were detached in an adhesive tape peeling test. FIG. 5B shows the sample containing 50% binder, in which no change was observed.

TABLE 1

Sheet Resistance depending on Types of CNTs

| | CNTs | Outer Diameter (nm) | CNT (wt %) | Binder (wt %) | Transmittance (%) | Sheet Resistance (Ω/sq) |
|---|---|---|---|---|---|---|
| Ex. 1 | MWNT | 4~10 | 5 | 95 | 80 | 55 M |
| | | | 10 | 90 | | 1200 K |
| | | | 15 | 85 | | 56 K |
| | | | 25 | 75 | | 4 k |
| | | | 50 | 50 | | 670 |
| C. Ex. 2 | | | 100 | 0 | | 240 |
| Ex. 2 | DWNT | 2~4 | 50 | 50 | 80 | 450 |
| C. Ex. 2 | | | 100 | 0 | | 180 |
| Ex. 3 | SWNT | 0.8~1.2 | 50 | 50 | 80 | 380 |
| C. Ex. 2 | | | 100 | 0 | | 160 |
| C. Ex. 3 | MWNT | 15~20 | 50 | 50 | 40 | 2 k |
| | | | 100 | 0 | | 1 k |

COMPARATIVE EXAMPLE 1

The present comparative example is directed to the preparation of a solution of CNTs which are not chemically treated.

In the case where acid treatment as in Example 1 is not applied, the SWNTs, the DWNTs, and the MWNTs were not dispersed in the polar solvent and the nonpolar solvent, making it impossible to manufacture a uniform transparent electrode (FIG. 2C).

COMPARATIVE EXAMPLE 2

The present comparative example is directed to the application of a binder-free CNT solution on the upper surface of a substrate.

A CNT solution (CNT/solvent, 50 mg/200 ml) was prepared in the dispersion state as in Example 1, and then applied through the same coating method as in Example 1 using a spray coater, without the addition of the binder, thus manufacturing a transparent conductive film. In the case of the conductive CNT layer thus prepared, relatively high sheet resistance was exhibited, but the conductive CNT layer was observed to be detached in the tape peeling test, as illustrated in FIG. 5.

COMPARATIVE EXAMPLE 3

The present comparative example is directed to the use of MWNTs having an outer diameter equal to or greater than 15 nm.

A binder solution was prepared as in Example 1, using MWNTs (ILJIN Nanotech, outer diameter: 15~20 nm), and dispersed and applied using the same method, thus manufacturing a transparent conductive film. As is apparent from Table 1, when the outer diameter of the CNTs was increased, transmittance was significantly decreased due to visible light absorption, and undesirably, the transparent conductive film could not achieve the transmittance at the same sheet resistance, compared to when using the MWNTs having the smaller outer diameter.

As described hereinbefore, the present invention provides a method of manufacturing a transparent conductive film containing CNTs and a binder, and a transparent conductive film manufactured thereby. According to the present invention, CNTs are subjected to acid treatment, to mixing with a binder, and then to application on a substrate, thereby obtaining a transparent conductive film having improved transparency, electrical conductivity, dispersibility, substrate adhesiveness, chemical stability, durability and scratch resistance.

Further, the transparent conductive film, having high substrate adhesiveness and applicability, may be applied on various substrates, including hard substrates or flexible substrates, and thus is expected to be highly useful in the fields of displays, solar cells, transparent electromagnetic wave blocking materials, and ray reflection films.

Furthermore, through purification and surface functionalization of CNTs having an outer diameter of less than 15 nm, dispersibility can be assured, and thus it is possible to realize higher sheet resistance at the same transmittance, consequently facilitating the manufacture of a transparent conductive film using various materials and generating economic benefits.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a transparent conductive film containing carbon nanotubes and a binder, comprising:
   1) treating the carbon nanotubes with an acid solution to realize a surface functionalization on the carbon nanotubes by introducing carboxyl group to end portions and surface of the carbon nanotubes, thereby increasing dispersibility of the carbon nanotubes to a solvent, wherein the acid solution is one selected from the group of acids consisting of nitric acid, hydrochloric acid, and sulfuric acid;
   2) washing the surface functionalized carbon nanotubes with distilled water to remove the acid solution;
   3) filtering the surface functionalized carbon nanotubes;
   4) drying the surface functionalized carbon nanotubes;
   5) dispersing the surface functionalized carbon nanotubes in the solvent to prepare a carbon nanotube solution, wherein the solvent is either a polar solvent or a nonpolar solvent;
   6) mixing a dispersion stabilizer into the carbon nanotube solution to further increase dispersibility of the surface functionalized carbon nanotubes in the solvent;
   7) mixing the carbon nanotube solution with the binder, thus preparing a carbon nanotube/binder coating solution;
   8) applying the carbon nanotube/binder coating solution on a surface of a substrate; and
   9) drying the substrate applied with the carbon nanotube/binder coating solution to remove the solvent and to solidify the binder.

2. The method as set forth in claim 1, wherein the) step of dispersing the surface functionalized carbon nanotubes in the solvent is conducted through ultrasonic dispersion or ball milling.

3. The method as set forth in claim 2, wherein the ultrasonic dispersion is conducted for 1~60 hours using a sonicator having power ranging from 50 W to 700 W at a frequency ranging from 20 kHz to 50 kHz.

4. The method as set forth in claim 1, wherein the) step of mixing the carbon nanotube solution with the binder is conducted by preparing a binder solution, including the binder and the polar or nonpolar solvent, which is then mixed with the carbon nanotube solution.

5. The method as set forth in claim 1, further comprising a step for controlling a viscosity of the carbon nanotube/binder coating solution, before the step of applying the carbon nanotube/binder coating solution on the surface of the substrate, wherein the viscosity of the carbon nanotube/binder coating solution is controlled by using an additional solvent suitable for a coating method or through vacuum distillation.

6. The method as set forth in claim 1, wherein the carbon nanotubes comprise one selected from among single-walled carbon nanotubes, double-walled carbon nanotubes, multi-walled carbon nanotubes, and mixtures thereof.

7. The method as set forth in claim 1, wherein the solvent comprises one or more selected from among acetone, methylalcohol, ethylalcohol, ethyleneglycol, polyethyleneglycol, tetrahydrofuran, dimethylformamide, dimethylacetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, and dimethylsulfoxide.

8. The method as set forth in claim 1, wherein the binder is added in an amount of 15~50 parts by weight, based on 100 parts by weight of a mixture of carbon nanotubes and binder, in which the binder comprises one or more of organic materials selected from the group consisting of thermoplastic resins, thermosetting resins, light curable resins, silane compounds, polymeric copolymers, self-assembled resins, and combinations thereof.

9. The method as set forth in claim 1, wherein the substrate comprises one selected from among glass, crystal, glass wafers, silicon wafers, and plastics.

10. The method as set forth in claim 1, wherein the applying the carbon nanotube/binder coating solution on the surface of the substrate is conducted through any one selected from among spraying, dip coating, spin coating, screen coating, ink-jet printing, pad printing, knife coating, kiss coating, and gravure coating.

11. The method as set forth in claim 1, wherein the carbon nanotubes are multi-walled carbon nanotubes having an outer diameter of less than 15 nm.

12. The method as set forth in claim 1, wherein the carbon nanotubes are single-walled carbon nanotubes containing semi-conductive carbon nanotubes and metallic carbon nanotubes.

13. The method as set forth in claim 1, wherein the solvent is made of a mixture of dimethyllformamide, tetrahydrofuran, ethanol, acetone and dimethylacetamide.

14. The method as set forth in claim 1, wherein the binder is a light curable acrylate epoxy.

15. The method as set forth in claim 14, further comprising a step of subjecting the substrate to radiating light at a wavelength of 320 nm and intensity of 30 mW/cm$^2$ for 1~2 minutes after the step of drying the applied carbon nanotube/binder coating solution.

* * * * *